US010275383B2

(12) United States Patent
Nickel

(10) Patent No.: US 10,275,383 B2
(45) Date of Patent: Apr. 30, 2019

(54) PARALLEL OPERATION OF A BUS SYSTEM AND A CAN BUS SYSTEM HAVING A DEVICE FOR COMPENSATING FOR INTERFERENCES

(71) Applicant: Robert Bosch GmbH, Stuttgart (DE)

(72) Inventor: Patrick Nickel, Birstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 129 days.

(21) Appl. No.: 14/442,046

(22) PCT Filed: Nov. 4, 2013

(86) PCT No.: PCT/EP2013/072903
§ 371 (c)(1),
(2) Date: May 11, 2015

(87) PCT Pub. No.: WO2014/072240
PCT Pub. Date: May 15, 2014

(65) Prior Publication Data
US 2015/0324315 A1    Nov. 12, 2015

(30) Foreign Application Priority Data
Nov. 9, 2012 (DE) .................. 10 2012 220 493

(51) Int. Cl.
*G06F 13/362* (2006.01)
*G06F 13/40* (2006.01)
*H04L 1/00* (2006.01)

(52) U.S. Cl.
CPC ........ *G06F 13/4068* (2013.01); *G06F 13/362* (2013.01); *H04L 1/0045* (2013.01); *H04L 2001/0094* (2013.01)

(58) Field of Classification Search
CPC . G06F 13/4068; G06F 13/362; H04L 1/0045; H04L 2001/0094
See application file for complete search history.

(56) References Cited

U.S. PATENT DOCUMENTS 4,090,137 A * 5/1978 Soma ..................... H04B 7/002
                                                         342/364
6,473,725 B1 * 10/2002 Schoellkopf ........ G06F 17/5022
                                                         703/15
(Continued)

FOREIGN PATENT DOCUMENTS

DE        10301637        7/2004
WO    WO2012/038472    3/2012

OTHER PUBLICATIONS

International Search Report for PCT/EP2013/072903, dated Jan. 29, 2014.

*Primary Examiner* — Henry Tsai
*Assistant Examiner* — John B Roche
(74) *Attorney, Agent, or Firm* — Norton Rose Fulbright US LLP; Gerard Messina

(57) ABSTRACT

A user station is provided for connecting to a bus line and a method for compensating for an interference due to a CAN bus system in a received signal. A signal of a CAN bus system is transmitted via the bus line in coexistence with a signal of a further bus system. The user station includes a receiving unit for receiving an overall signal and for compensating for an interference in the received overall signal which occurs due to a changing output impedance of a user station of the CAN bus system which is connected to the bus line.

18 Claims, 4 Drawing Sheets

(56) References Cited

U.S. PATENT DOCUMENTS

| | | | |
|---|---|---|---|
| 6,795,496 B1* | 9/2004 | Soma | G01R 29/26 324/620 |
| 7,512,503 B2* | 3/2009 | Bechhoefer | G01R 31/11 702/58 |
| 2003/0076221 A1 | 4/2003 | Akiyama et al. | |
| 2003/0085729 A1* | 5/2003 | Binkley | G01R 31/3004 324/762.01 |
| 2003/0114126 A1* | 6/2003 | Wang | H04W 88/02 455/234.2 |
| 2005/0206240 A1* | 9/2005 | Enders | B60R 16/0315 307/10.1 |
| 2005/0226353 A1* | 10/2005 | Gebara | H01Q 1/521 375/346 |
| 2007/0030126 A1* | 2/2007 | Friedrich | G06K 7/0008 340/10.2 |
| 2009/0016467 A1* | 1/2009 | Lui | H04L 7/0054 375/340 |
| 2011/0015786 A1* | 1/2011 | Kawai | A61B 1/00147 700/256 |

* cited by examiner

PARALLEL OPERATION OF A BUS SYSTEM AND A CAN BUS SYSTEM HAVING A DEVICE FOR COMPENSATING FOR INTERFERENCES

FIELD OF THE INVENTION

The present invention relates to a user station for connecting to a bus line and to a method for compensating for an interference due to a CAN bus system in a received signal.

BACKGROUND INFORMATION

In motor vehicles, hospitals, etc., the CAN bus system has presently established itself as an affordable standard bus system. Messages or signals according to the CAN specification in ISO 11898 are transmitted therein between user stations which are also referred to as nodes. The user stations are, for example, control units or display devices of a motor vehicle, etc.

To allow for high data rates in the architectures of motor vehicle control units, for example, new high-rate bus systems are presently introduced. In this case, network sections are oftentimes built on the basis of different systems, LIN, CAN, FlexRay, Ethernet, etc., being used, for example. For this purpose, each bus system uses its own connection topology in the form of dedicated lines between the corresponding bus users.

It would be desirable, when a second bus system, which is in particular suitable for the high-rate transmission of data, could be designed in such a way that it may be operated on the same cable in parallel to an existing CAN bus, the first bus system. This requires an independent coexistence of the CAN bus system and the second bus system, i.e., of both systems.

An expansion of existing communication networks on the basis of existing standards to include further transmitting and receiving units by using separate channels is discussed in German Published Patent Application No. 103 01 637, for example.

Studies have shown that designing two systems on different frequency ranges is by itself not sufficient for a coexistence as long as the CAN bus, as one of the two systems, couples into the bus dominant and recessive bit states having different impedances with the aid of customary transmitting and receiving units, which are also referred to as transceivers. A technology of this type is, however, the basis of the CAN transmission mechanism including the arbitration. Changing this would intervene too strongly into the system properties of the CAN transmission mechanism.

It is problematic that a change in the bus impedance in accordance with the starting condition of the CAN transceiver causes a transmission medium which is no longer statically acceptable. A change may be modeled as a node impedance of the CAN nodes which changes over time. Moreover, these impedances are in general a function of the frequency.

In addition to this impedance effect, an interference for the second bus system in the form of harmonic waves of the CAN transmission exists on the bus line. The performance density of the harmonic waves, however, strongly drops toward higher frequencies. The interference may be limited to a tolerable degree with the aid of a suitable selection of the, in particular high-frequency, spectrum and design of the transmitting power of the second bus system. This, however, results in the problem that the non-static bus impedance manifests itself in a multiplication of the, in particular high-frequency, signal of the second bus system by the CAN signal and results in additional components in the received signal. The power of these portions scales with the transmitting power of the second bus system and therefore results in an inherent interference power which increases proportionally to the transmitting power. This may result in that a reception is no longer possible under the customary quality requirements, in particular with regard to the error rates which are to be complied with.

For these reasons, an interconnection of the CAN bus system with a second bus system is usable only to a limited extent without further measures.

SUMMARY

Therefore, it is the object of the present invention to provide a user station for connecting to a bus line and a method for compensating for an interference due to a CAN bus system in a received signal which solve the previously mentioned problems. In particular, a user station for connecting to a bus line and a method for compensating for an interference due to a CAN bus system in a received signal are to be provided which are able to receive signals, which are transmitted via one bus line which is used in parallel for the CAN bus system and a further bus system, at a good reception quality.

The object is achieved with the aid of a user station for connecting to a bus line. With regard to the user station, a signal of a CAN bus system may be transmitted with the aid of the bus line in coexistence with a signal of a further bus system. The user station includes a receiving unit for receiving a signal with regard to the further bus system and for compensating for an interference in the received signal which occurs due to a changing output impedance of a user station of the CAN bus system which is connectable to the bus line.

The user station may process the received signal which is received in the receiving unit with the aid of signal processing, in particular as preprocessing, in such a way that the influences of the CAN signal are eliminated for the most part. As a special characteristic, this may be combined as preprocessing with many transmission processes.

The user station makes possible the utilization of a further bus system having a high-rate transmission when using higher frequency ranges in coexistence with a CAN bus system in an existing topology (bus wiring).

With the aid of the user station, an efficient transmission having a high-level symbol constellation is possible even if the changing output impedance of a CAN user station, which is operated in parallel, results in strong interferences for customary transmission processes. A compensation of the CAN signal is carried out in the receiving unit of the further bus system and is possible as a preprocessing algorithm, thus requiring little effort.

The advantages of the present invention are thus that the independent, parallel operation of the CAN bus system together with a further bus system is made possible on the same wiring (and topology).

Advantageous further embodiments of the user station are indicated in the dependent patent claims.

The receiving unit may include: a clock estimation device for estimating the clock pulse of a CAN signal in the signal which is received by the receiving unit (20), a detection device for detecting the states of the CAN signal for each period, a simulation device for simulating the hypothetically transmitted CAN signal, a value estimation device for estimating the values in the range of the respective state of the CAN signal, a determination device for determining the predetermined coefficients for the signal received by the receiving unit and a compensation device for compensating for the portion of the CAN signal in the signal of the further bus system.

It is possible that the clock estimation device for estimating the clock pulse of the CAN signal is implemented with the aid of a signal-adapted filter (matched filter). In this case, a filter having an arbitrary impulse response which is previously preset with an impulse form adapted to the transmission may be used instead of the signal-adapted filter. In this case, the signal-adapted filter may be alternatively implemented for use of a rectangular impulse response or a suitable impulse response such as the one of a cosine roll-off filter in accordance with the symbol duration which is previously preset with standard values of the used pulse form. The signal-adapted filter may also be implemented via established maxima and minima within the processing of a message block for establishing an edge mean value and for using the intersection points with the output signal of the signal-adapted filter as reference points in time.

The detection device may be implemented to detect the states of the CAN signal on the basis of an output signal of a signal-adapted filter and a chronological position of the change in the states of the CAN signal.

The previously described user station may be part of a system which in addition includes a bus line and a second user station for transmitting signals according to the CAN protocol on the bus line. In this case, the previously described user station is connected to the bus line.

The previously mentioned object is moreover achieved with the aid of a method for compensating for an interference due to a CAN bus system in a received signal as recited in Patent claim 9, the CAN bus system transmitting a signal in coexistence with a signal of a further bus system on one bus line. The method includes the following steps: receiving, with the aid of a receiving unit, a signal with regard to the further bus system and compensating for an interference in the signal received in the step of receiving, this interference occurring due to a changing output impedance of a user station of the CAN bus system which is connected to the bus line.

The method offers the same advantages as the ones mentioned previously with regard to the user station.

Other possible implementations of the present invention also include not explicitly mentioned combinations of features or specific embodiments described previously or in the following with regard to the exemplary embodiments. For this purpose, those skilled in the art will add individual aspects as improvements or enhancements to the particular base form of the present invention.

BRIEF DESCRIPTION OF THE DRAWINGS

FIG. 4 shows a flow chart of a method according to the first exemplary embodiment with the aid of which an interference in a bus signal due to a CAN bus system may be compensated for.

In the figures, elements which are identical or have identical functions are identified with identical reference numerals, unless otherwise indicated.

DETAILED DESCRIPTION

Figure 1:
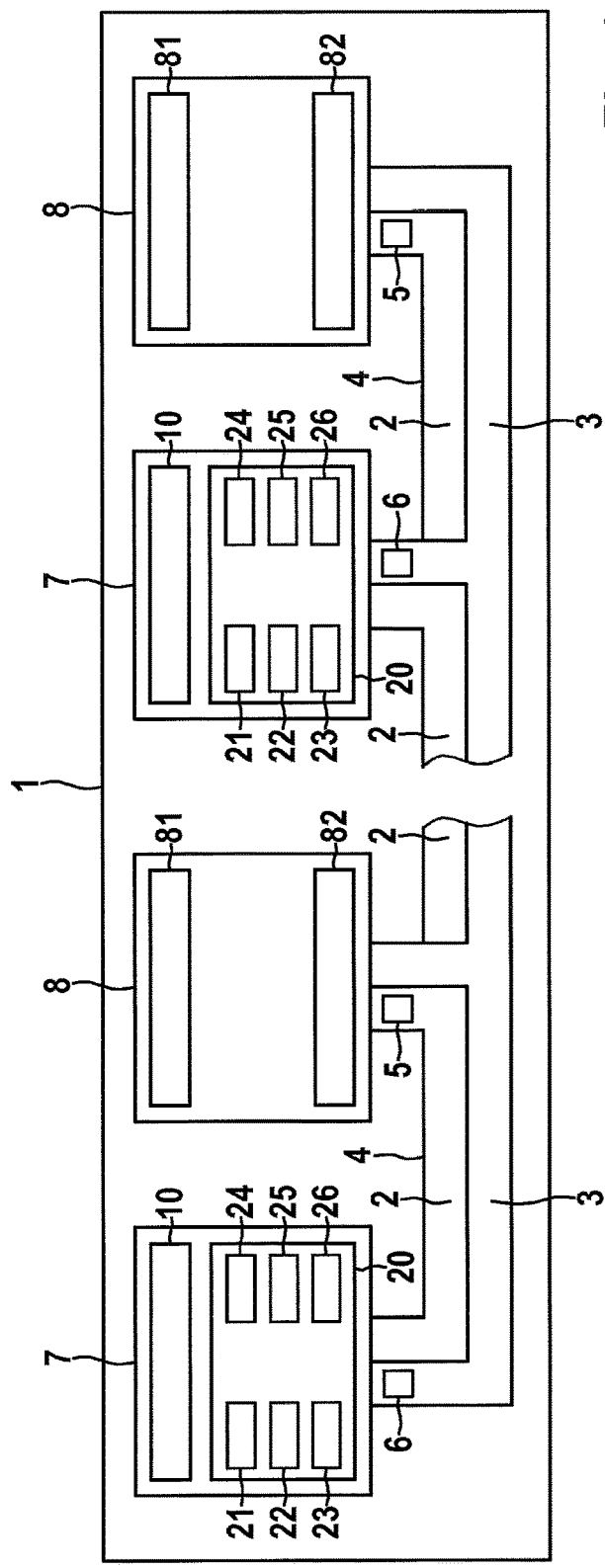
FIG. 1 shows a simplified block diagram of a bus system according to one first exemplary embodiment.

FIG. 1 shows a system 1 including a bus system 2, which is referred to in the following as CAN bus system 2, and a further bus system 3 which are integrated into a shared bus line 4. CAN bus system 2 and further bus system 3 may also be referred to as channels of shared bus line 4. On bus line 4, messages are transmitted in the form of signals 5, 6 to user stations 7, 8 which are connected to bus line 4. User stations 7 are user stations of further bus system 3. User stations 8 are user stations of CAN bus system 2. In CAN bus system 2, messages are transmitted in the form of signals 5 according to the CAN protocol; in further bus system 3, messages are transmitted in the form of signals 6. Signals 5, 6 influence one another as described in the following in greater detail. However, CAN bus system 2 may be operated in parallel to further bus system 3, such as LIN, FlexRay, Ethernet, etc., on shared bus line 4.

System 1 may be used in a vehicle, in particular a motor vehicle, a plane, etc., or in a hospital, etc. User stations 7, 8 may be, for example, control units or display devices of a motor vehicle.

As shown in FIG. 1, user stations 7 each include a communication control unit 10 and a receiving unit 20. Receiving unit 20 includes a clock estimation device 21, a detection device 22, a simulation device 23, a value estimation device 24, a determination device 25 and a compensation device 26.

User stations 8 in FIG. 1 each include a communication control unit 81 and a receiving unit 82.

Receiving unit 20 is able to receive a message in the form of a signal 6 in accordance with further bus system 3 from a further user station 7 via bus line 4. This signal 6 is then processed by receiving unit 20 with the aid of its devices 21 through 26 as is described in the following with the aid of an example of a simple system model which is illustrated in FIG. 2 and FIG. 3.

Figure 2:
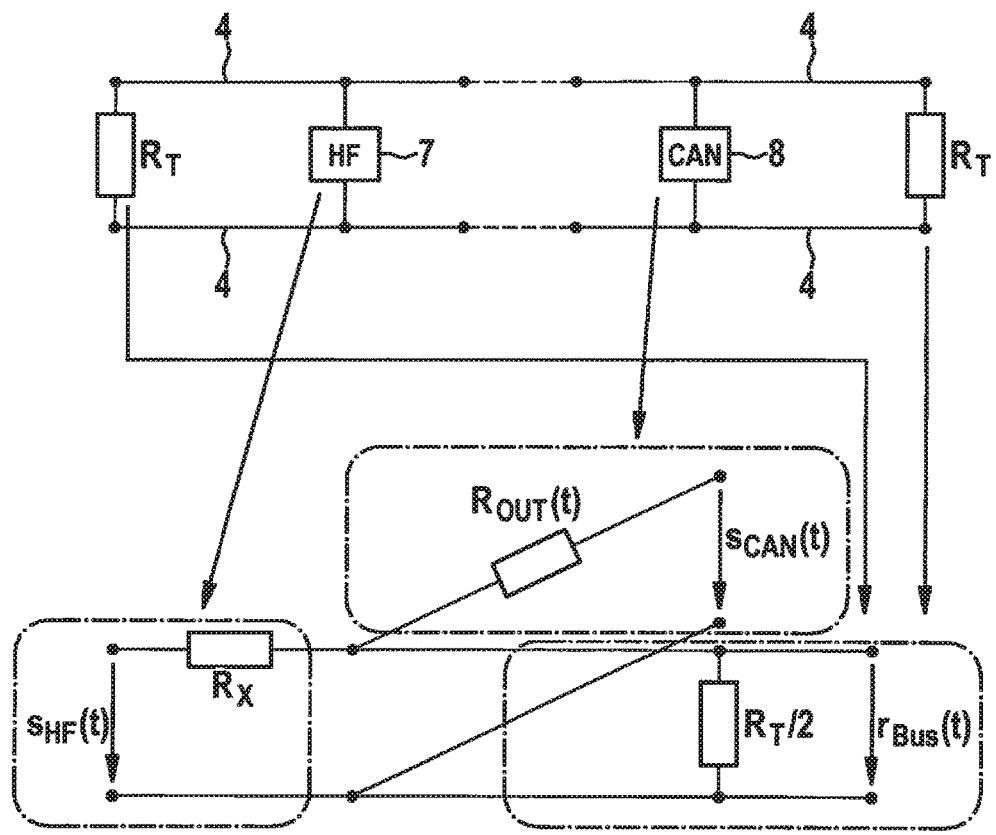
FIG. 2 shows an electrical equivalent circuit diagram of the bus system according to the first exemplary embodiment and another electrical equivalent circuit diagram of the bus system according to the first exemplary embodiment.
Figure 3:
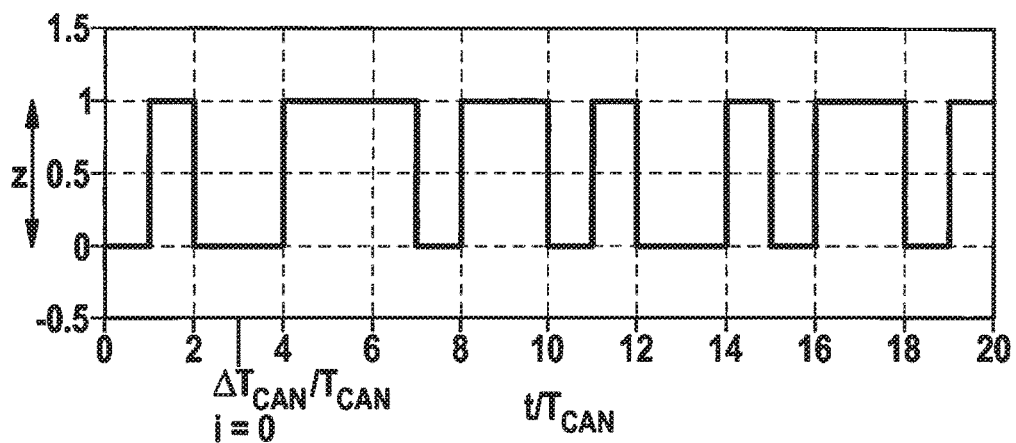
FIG. 3 shows one example of a signal characteristic of a CAN transmission signal which is transmitted via the bus system according to the first exemplary embodiment.

As shown in FIG. 2, it is assumed that per bus system 2, 3 (FIG. 1) one user station, which may also be referred to as a node, is connected to bus line 4 which has terminals on both sides. Here, "HF" stands for a user station 7 and "CAN" stands for a user station 8 in FIG. 2. The expansion of bus line 4 and a symmetrization are neglected in a further modeling which is shown in FIG. 2. Accordingly, the termination of bus line 4 including ferrule resistor $R_T$ on both ends may be combined to one resistor having a value $R_T/2$.

As is further shown in FIG. 2, it is assumed for further bus system 3 (FIG. 1) that a (voltage) signal $s_{HF}(t)$ is coupled on bus line 4 into further bus system 3 (FIG. 1) via a resistor $R_X$. The CAN node or user station 8 is essentially modeled by (voltage) signal $s_{CAN}(t)$ and time-variable internal impedance $R_{OUT}(t)$ which is superimposed by the signal of user station 7 in (voltage) received signal $r_{Bus}(t)$. Time-variable impedance $R_{OUT}(t)$ is formed by the changing output impedance of a user station 8 of CAN bus system 2 (FIG. 1). The changing output impedance of user station 8 may also be referred to as time-variable impedance $R_{OUT}(t)$.

Thus, the following description for a resulting signal on bus line 4 yields which signal is received at receiving unit 20 as received signal $r_{Bus}(t)$:

$$r_{Bus}(t) = s_{CAN}(t) \times (R_T/2 \| R_X)/(R_{OUT}(t) + R_T/2 \| R_X) + \quad (1)$$
$$s_{HF}(t) \times (R_T/2 \| R_{OUT}(t))/(R_X + R_T/2 \| R_{OUT}(t))$$

Accordingly, received signal $r_{Bus}(t)$ also contains a component $s_{can}(t) \times s_{HF}(t)$ in addition to components $s_{CAN}(t)$ and $s_{HF}(t)$. The reason for this is that $R_{OUT}(t) \approx \alpha \; s_{CAN}(t) + \beta$ applies, a standing for the constant at which the internal resistance changes proportionally to the CAN signal, and $\beta$ representing an additional bias. In real systems $\alpha \ll R_T/2/\max\{s_{CAN}(t)\}$ and $\beta \approx R_T/2$) often applies.

Therefore, received signal $r_{Bus}(t)$ may be described in a simplified manner as a composition of three components:

$$r_{Bus}(t) = a_1 s_{CAN}(t) + a_2 s_{HF}(t) + a_3 s_{CAN}(t) \times s_{HF}(t) \quad (2)$$

A block processing is now assumed for the further description, although all parts may also be processed sequentially.

It is assumed for the transmission that CAN signal $s_{CAN}(t)$ assumes states z, which are normed in this case for the purpose of a simpler illustration, in accordance with $s_{CAN}(t) \in \{0,1\}$ and accidentally changes these states z at a fixed period or clock cycle $T_{CAN}$, as illustrated in FIG. 3. Here, time t is illustrated with reference to clock cycle $T_{CAN}$. $\Delta T_{CAN}$ represents an arbitrary time offset between the transmitter and the receiver which is at $t/T_{CAN}=3$ in the example shown in FIG. 3. This position simultaneously corresponds to value 0 of time index i, which in the following refers to the periods of the CAN signal, as is apparent from the equation (3) indicated later on.

Furthermore, the medium power outputs $E\{|s_{HF}(t)|^2\}$ of medium value free signal $s_{HF}(t)$ is arbitrarily assumed to be one: $E\{s_{HF}(t)\}=0$, $E\{|s_{HF}(t)|^2\}=1$.

Now, it is necessary to use these assumptions to estimate factors or coefficients $a_1$, $a_2$, and $a_3$ of received signal $r_{Bus}(t)$ and to strive for a compensation of term $a_3 s_{CAN}(t) \times s_{HF}(t)$ in received signal $r_{Bus}(t)$. Term $a_3 s_{CAN}(t) \times s_{HF}(t)$ represents the interference in received signal $r_{Bus}(t)$ which occurs due to changing output impedance $R_{OUT}(t)$ of user station 8.

Figure 4:
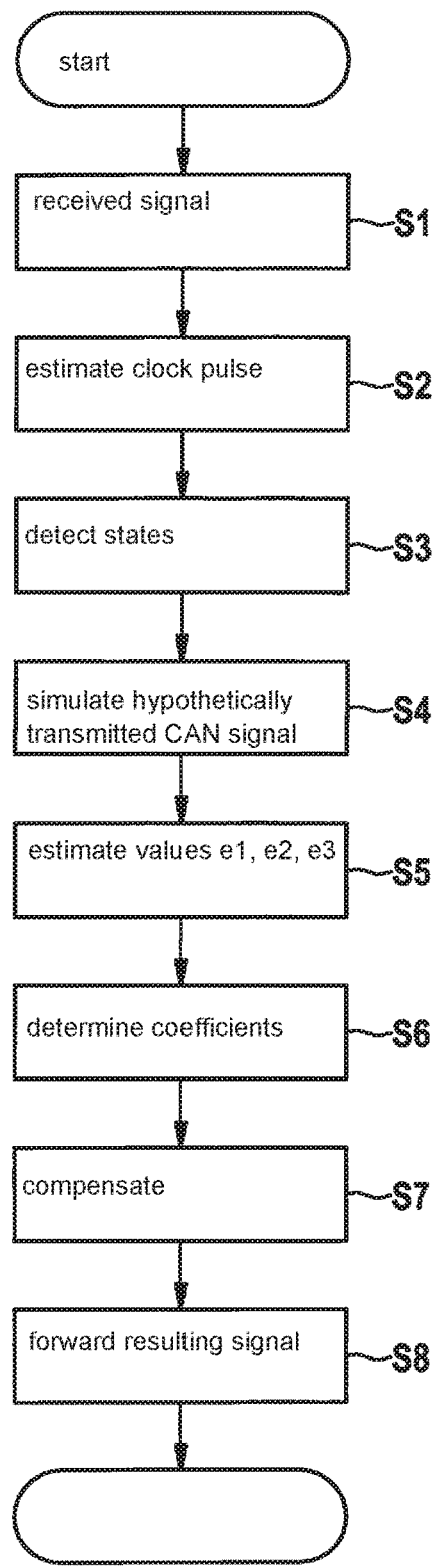

FIG. 4 schematically shows the sequence of a process which takes place in receiving unit 20 and includes a method for compensating for interferences in the bus signal or in received signal $r_{Bus}(t)$ due to CAN bus system 2 in which CAN signal $s_{CAN}(t)$ is transmitted.

Accordingly, after starting the method with a step S1, a signal of further bus system 3, received signal $r_{Bus}(t)$, is received by receiving unit 20. This signal includes signal 5 and an interference due to changing output impedance $R_{OUT}(t)$ of user station 8. Thereupon, the flow proceeds to a step S2 at which the method starts compensating for the interference.

In step S2, clock pulse $T_{CAN}$ of CAN signal $s_{CAN}(t)$ is estimated by clock estimation device 21. Thereupon, the flow proceeds to a step S3.

In step S3, detection device 22 detects states z (cf. also FIG. 4) of CAN signal $s_{CAN}(t)$ for respective time index i. In this case, the following equation applies to time t $$t = iT_{CAN} + \Delta T_{CAN}, \quad (3)$$

as shown in FIG. 3. The states are either 0 or 1, as indicated previously. Thereupon, the flow proceeds to a step S4 in FIG. 4.

In step S4, simulation device 23 simulates hypothetically transmitted CAN Signal $s'_{CAN}(t) \in \{0,1\}$. Thereupon, the flow proceeds to a step S5.

In step S5, value estimation device 24 estimates values $e_1$, $e_2$, $e_3$. This takes place in the range of the respective state of CAN signal $s_{CAN}(t)$ as a boundary condition. Here, the following applies $$e_1 = E\{|r_{Bus}(t)|^2 | s'_{CAN}(t)=0\}|$$

$$e_2 = E\{|r_{Bus}(t)| s'_{CAN}(t)=1\}$$

$$e_3 = E\{|r_{Bus}(t)|^2 | s'_{CAN}(t)=1\}|$$

Thereupon, the flow proceeds to a step S6.

In step S6, determination device 25 determines coefficients $a_3'$, $a_2'$, $a_1'$ in accordance with the following rule. Coefficients $a_3'$, $a_2'$, $a_1'$ are subsequently also referred to as predetermined coefficients and are estimated values of factors $a_3$, $a_2$, $a_1$ of the signal which is transmitted on bus line 4, more precisely on further bus system 3, and which is received as a received signal $r_{Bus}(t)$ at receiving unit 20. Here, the following applies:

$$a_3' = \mathrm{sqrt}(e_1)$$

$$a_2' = e_2$$

$$a_1' = \mathrm{sqrt}(e_3 - a_2'^2) - a_3$$

Here, "sqrt( . . . )" stands for the square root from a term in the brackets. Thereupon, the flow proceeds to a step S7.

In step S7, compensation device 26 compensates for the portion of CAN signal $s_{CAN}(t)$ in the signal of further bus system 3, i.e., received signal $r_{Bus}(t)$. Resulting signal $r_{Bus}'(t)$ represents a reconstruction of the signal of further bus system 3, signal $s_{HF}(t)$, so that the latter may be processed using the customary receiving processes:

$$r'_{Bus}(t) = (r_{Bus}(t) - a_1' s'_{CAN}(t))/(a_2' + a_3' s'_{CAN}(t)) = \quad (3)$$
$$(r_{Bus}(t) - a_1' s'_{CAN}(t)) \times (a_2' - a_3' s'_{CAN}(t))/(a_2'^2 + a_3'^2)$$

Thereupon, the method for compensating is terminated, the flow proceeding to a step S8.

In step S8, receiving unit 20 forwards resulting signal $r_{Bus}'(t)$ to communication control unit 10, if necessary after further processing which is customary for further bus system 3. The method is then terminated.

In the case of the previously described method, the clock estimation in step S1 may, for example, be carried out with the aid of a signal-adapted filter (matched filter) in which the receiving and the transmitting filters are adapted. In this case, a rectangular impulse response of the duration or having clock pulse $T_{CAN}$ is assumed, this duration being initially preset with standard values of the used impulse form. The standard values are, for example, the edges, amplitudes (minimum and maximum), clock pulse, etc., of the impulse form. An edge mean value is then established via determined maxima and minima within a processing of a message block of a message on which signal 5 is based, and the intersection points with the output signal of the signal-adapted filter (matched filter output signal) are used as the reference points in time. They may be used to determine exact value $T_{CAN}$ as well as the chronological position of the CAN state changes, which is subsequently carried out in step S2.

This means that in step S2, CAN states z may be detected on the basis of the output signal of the signal-adapted filter and the chronological position of the CAN state changes.

According to one second exemplary embodiment, simulation device 23 may simulate in step S3 the signal not on the basis of a rectangular filter, but with the aid of a cosine roll-off filter (from "raised-cosine" edges), as shown in FIG. 6. They have good spectral properties and prove particularly advantageous in the time domain in particular in the case of a multiplication as the one carried out later on in step S6 by compensation device 26. Similarly, a direct optimization of the edges of hypothetical transmission signal $s'_{CAN}(t)$ is possible, so that instead of the rectangular pulses, pulse forms having arbitrary, even trapezoidal and cosine-shaped, etc., transitions may be used. In this way, the robustness of the method which is carried out by receiving unit 20 may be improved with regard to errors in the clock estimation by the clock estimation device in step S1 and a reconstruction of the reference points in step S4.

Otherwise, the second exemplary embodiment is designed in the same manner as described in the first exemplary embodiment.

All of the previously described embodiments of system 1, in particular of user stations 7, 8, and of the method may be used alone or in any possible combinations. In particular, features and/or functions of the first and the second exemplary embodiments may be arbitrarily combined. In addition, the following modifications are, in particular, conceivable.

Previously described CAN bus system 2 according to the first and the second exemplary embodiments is described with reference to the bus system which is based on the CAN protocol. CAN bus system 2 according to the first and the second exemplary embodiments may, however, also be a different type of communication network. It is possible, however not an absolutely necessary prerequisite, that an exclusive, collision-free access of a user station 8 to a shared channel is ensured in bus system 2 at least for certain periods of time.

CAN bus system 2 according to the first and the second exemplary embodiments is in particular a CAN network or a TTCAN network (TTCAN=Time Triggered Controller Area Network), in the case of which a time controller is applied to the existing CAN, or a CAN FD network (CAN with flexible data-rate), in the case of which the data rate is flexibly selectable and messages are transmitted in accordance with the specification "CAN with Flexible Data-Rate, Specification Version 1.0" (source http://www.semiconductors.bosch.de).

The number and arrangement of user stations 7, 8 in bus systems 2, 3 of bus line 4 of the first and the second exemplary embodiments is arbitrary. In addition, a user station may also be present which may receive and process the signals of CAN bus system 2 as well as those of further bus system 3. Receiving units 20, 82 may each also be implemented as transceiver units which are able to transmit and receive signals.

Figure 5:
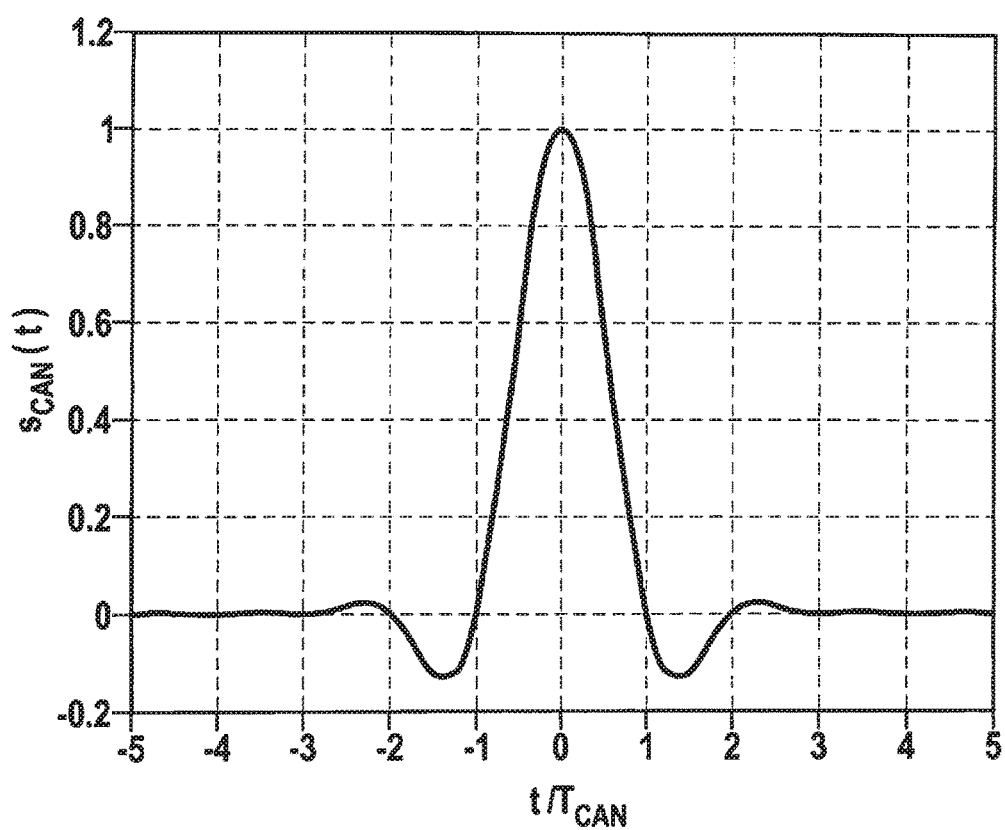
FIG. 5 shows another example of a signal characteristic of the impulse response of a cosine roll-off filter.

Receiving unit 20 may be designed in such a way that it carries out the method for compensating according to previously described steps S2 through S7 of FIG. 5 only if a transmission using CAN bus system 2 on the bus line takes place and thus a changing output impedance $R_{OUT}(t)$ is present.

If the pulse form of transceiver unit 82, which may also be referred to as a CAN transceiver, of user station 8 strongly deviates from a rectangle, it is possible to adapt the basis signal form itself instead of just the edges in step S3 of the method carried out by receiving unit 20. Accordingly, the amplitudes, etc., may also be adapted.

Alternatively to the previously mentioned possibilities for a clock estimation in step S1 of the method carried out by receiving unit 20 and/or for a detection of the CAN states in step S2 of the method carried out by receiving unit 20, it is possible to use existing or known methods of clock synchronization and existing receiving techniques and to deliver the necessary parameters to the compensation algorithm which is carried out in further steps S3 through S4.

What is claimed is:

1. A user station for connecting to a bus line, the bus line carrying a signal of a Controller Area Network ("CAN") bus system in coexistence with a signal of a further bus system on the bus line, the user station comprising:
    a receiving unit for receiving a signal of the further bus system via the bus line and for compensating for an interference in the received signal that occurs due to a changing output impedance of a user station of the CAN bus system that is connectable to the bus line;
    wherein the receiving unit compensates for the interference using a simulation of a hypothetically transmitted CAN signal; and
    wherein the receiving unit is configured to: (i) simulate a first hypothetically transmitted CAN signal at state 0, and a second hypothetically transmitted CAN signal at state 1, (ii) determine coefficients based on the received signal of the further bus system and the first and second hypothetically transmitted CAN signals, and (iii) compensate for the interference using the received signal of the further bus system and the coefficients.

2. The user station as recited in claim 1, wherein the receiving unit includes:
    a clock estimation device for estimating a clock pulse of a CAN signal in the signal that is received by the receiving unit,
    a detection device for detecting the state of the CAN signal during each period,
    a simulation device for simulating the CAN signal according to a hypothetical transmission,
    a value estimation device for estimating values in a range of the respective state of the CAN signal,
    a determination device for determining predetermined coefficients for the signal that is received by the receiving unit, and
    a compensation device for compensating for a portion of the CAN signal in the signal of the further bus system.

3. The user station as recited in claim 2, wherein the clock estimation device for estimating the clock pulse of the CAN signal includes a signal-adapted filter.

4. The user station as recited in claim 2, wherein the clock estimation device for estimating the clock pulse of the CAN signal includes a filter having an arbitrary impulse response which is previously preset with an impulse form adapted to the transmission.

5. The user station as recited in claim 3, wherein the signal-adapted filter is implemented for use of one of a rectangular impulse response and an impulse response of a cosine roll-off filter in accordance with a symbol duration which is previously preset with standard values of the used impulse form.

6. The user station as recited in claim 5, wherein the signal-adapted filter is implemented via established maxima and minima within a processing of a message block for establishing an edge mean value and for using intersection points with an output signal of the signal-adapted filter as reference points in time.

7. The user station as recited in claim 2, wherein the detection device detects the state of the CAN signal on the basis of an output signal of a signal-adapted filter and a chronological position of a change in the state of the CAN signal.

8. The user station as recited in claim 1, wherein the received signal includes, as the interference, at least a portion of a CAN signal, and the receiving unit compensates for the interference in the received signal by compensating for the portion of the CAN signal in the received signal.

9. The user station as recited in claim 1, wherein the interference in the received signal is due to a CAN bus transmission mechanism including CAN bus arbitration.

10. The user station as recited in claim 1, wherein the receiving unit determines the coefficients based on estimate values determined using the first and second hypothetically transmitted CAN signals as boundary conditions on the received signal.

11. A system, comprising:
   a bus line which carries a signal of a Controller Area Network ("CAN") bus system along with, and in coexistence with, a signal of a further bus system;
   a first user station connected to the bus line and including:
      a receiving unit for receiving a signal of the further bus system via the bus line and for compensating for an interference in the received signal that occurs due to a changing output impedance of a user station of the CAN bus system that is connectable to the bus line; and
   a second user station for transmitting signals according to a CAN protocol on the bus line;
   wherein the receiving unit compensates for the interference using a simulation of a hypothetically transmitted CAN signal; and
   wherein the receiving unit is configured to: (i) simulate a first hypothetically transmitted CAN signal at state 0, and a second hypothetically transmitted CAN signal at state 1, (ii) determine coefficients based on the received signal of the further bus system and the first and second hypothetically transmitted CAN signals, and (iii) compensate for the interference using the received signal of the further bus system and the coefficients.

12. The system as recited in claim 11, wherein the received signal includes, as the interference, at least a portion of a CAN signal, and the receiving unit compensates for the interference in the received signal by compensating for the portion of the CAN signal in the received signal.

13. The system as recited in claim 11, wherein the interference in the received signal is due to a CAN bus transmission mechanism including CAN bus arbitration.

14. The system as recited in claim 11, wherein the receiving unit determines the coefficients based on estimate values determined using the first and second hypothetically transmitted CAN signals as boundary conditions on the received signal.

15. A method for compensating for an interference due to a Controller Area Network ("CAN") bus system in a received signal, the CAN bus system transmitting a signal in coexistence with a signal of a further bus system on a bus line, the method comprising:
   receiving via the bus line, with the aid of a receiving unit, a signal of the further bus system; and
   compensating for an interference in the signal received in the receiving step, the interference occurring due to a changing output impedance of a user station of the CAN bus system that is connected to the bus line;
wherein the receiving unit compensates for the interference using a simulation of a hypothetically transmitted CAN signal;
   wherein the compensating includes (i) simulating, by the receiving unit, a first hypothetically transmitted CAN signal at state 0, and a second hypothetically transmitted CAN signal at state 1, (ii) determining, by the receiving unit, coefficients based on the received signal of the further bus system and the first and second hypothetically transmitted CAN signals, and (iii) compensating, by the receiving unit, for the interference using the received signal of the further bus system and the coefficients.

16. The method as recited in claim 15, wherein the signal of the further bus system received in the receiving step includes, as the interference, at least a portion of a CAN signal, and the compensating step includes compensating for the portion of the CAN signal in the received signal.

17. The method as recited in claim 15, where the interference in the received signal is due to a CAN bus transmission mechanism including CAN bus arbitration.

18. The method as recited in claim 15, wherein the receiving unit determines the coefficients based on estimate values determined using the first and second hypothetically transmitted CAN signals as boundary conditions on the received signal.

* * * * *